Dec. 28, 1971   L. H. BRIXNER   3,630,947
EUROPIUM STRONTIUM CHLORIDE PHOSPHATE FLUORESCENT COMPOSITION
Filed Oct. 17, 1969

INVENTOR
LOTHAR H. BRIXNER

BY

ATTORNEY

United States Patent Office 3,630,947
Patented Dec. 28, 1971

3,630,947
EUROPIUM STRONTIUM CHLORIDE PHOSPHATE FLUORESCENT COMPOSITION
Lothar H. Brixner, West Chester, Pa., assignor to E. I. du Pont de Nemours and Company, Wilmington, Del.
Filed Oct. 17, 1969, Ser. No. 867,990
Int. Cl. C09k 1/06, 1/36
U.S. Cl. 252—301.4 P
1 Claim

ABSTRACT OF THE DISCLOSURE

Luminescent compositions of the formula $$Sr_{5-x}Eu_x(PO_4)_3Cl$$

Figure 1:
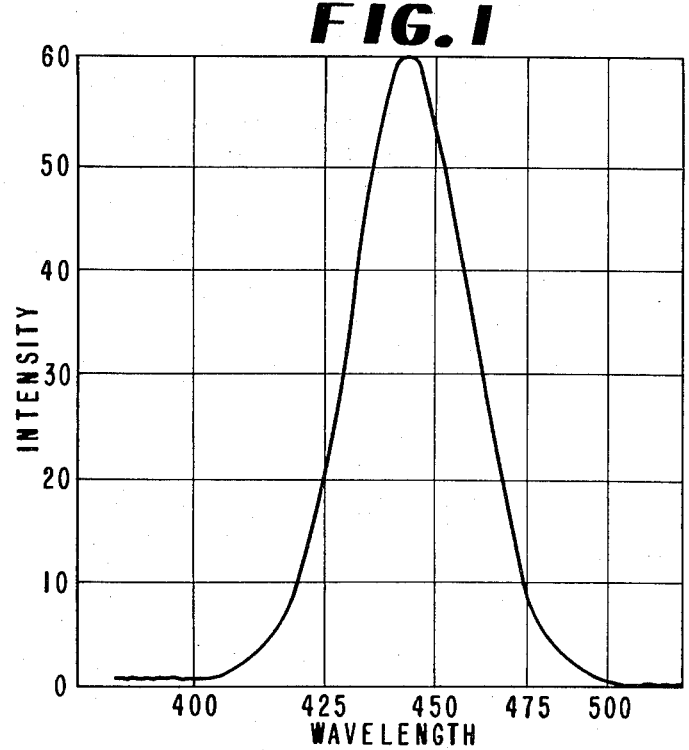

where $x$ has a value from 0.04 to 0.5; the compositions are prepared by a flux-reaction technique using sources of strontium chloride, $P_2O_5$, and europium oxide in the presence of water vapor. The product crystallizes as colorless needles having the $P6_3/m$ space group of apatite. Under ultraviolet, X-ray or electron excitation, the compositions fluoresce strongly emitting blue light.

BACKGROUND

Fluorescent materials, known as fluors or phosphors, emit electromagnetic radiation in the visible range of the spectrum when excited by incident radiation of another wavelength. Fluors differ from phosphors in that emission from a fluor ceases when the exciting radiation terminates but emission from a phosphor continues for a period after the exciting radiation terminates. Zinc sulfide is a fluor which emits radiation in the visible blue range and calcium tungstate is a phosphor which emits radiation in the visible blue range. Such fluorescent materials are useful as coatings in television picture tubes, fluorescent screens, films, light tubes or lasers.

Prior art fluorescent materials and methods of producing them have imperfections and difficulties. Efficiency, intensity, crystal imperfections, and crystal changes limit the development of fluorescent materials. Enveloping atmosphere, chemical variation and complicated techniques make production methods difficult. The following articles in the art discuss such problems: (1) F. C. Palilla et al., J. Electrochem. Soc., 115, 1076 (1968); (2) L. H. Brixner, J. Am. Chem. Soc., 81, 3841 (1959); (3) R. Mazelsky et al., J. Electrochem. Soc., 115, 68 (1968); (4) T. L. Barry, J. Electrochem. Soc., 115, 1181 (1968).

SUMMARY OF THE INVENTION

The present invention provides novel compositions of the formula $Sr_{5-x}Eu_x(PO_4)_3$ Cl, where $x$ ranges from 0.04 to 0.5. The preferred range of $x$, where the fluorescence is strongest, is from 0.1 to 0.3. The broad range is a substitution of europium of from 0.8 to 10 percent of the sum of strontium-plus-europium atoms in the composition, while the preferred range is a substitution of 2.0 to 6.0 percent. These compositions are provided in the form of large individual crystals which are relatively perfect. They exhibit several unexpected characteristics, such as the apatite crystal structure, an apparently much more stable form than other possibilities. The europium therein is in the divalent state, whereas it would ordinarily be expected to be trivalent under the oxidizing conditions employed, as will be apparent hereinafter.

The foregoing compositions are produced upon fusing and reacting together a compound of europium, a source of phosphate ion, and an excess of strontium chloride. The strontium chloride provides a reactant as well as a fluxing medium. The reaction is carried out in the presence of water vapor at temperatures sufficient to melt the reactants, initiate the reaction and evolve hydrogen chloride (HCl). The preferred temperautre range is 900° C. to 1200° C. Europium is introduced by adding the necessary amount of europium, or a source thereof such as europium oxide, europium hydroxide or a hydrolysable europium salt, to produce the composition with the desired europium content. This general method of preparing the europium substituted strontium chloride phosphates of this invention is advantageous in that excess reagents ($SrCl_2$) and by-products (HCl, $H_2O$) are either volatile or water soluble. Since the desired product is water-insoluble, it may be recovered readily by aqueous leaching.

In the attached drawing

Figure 2:
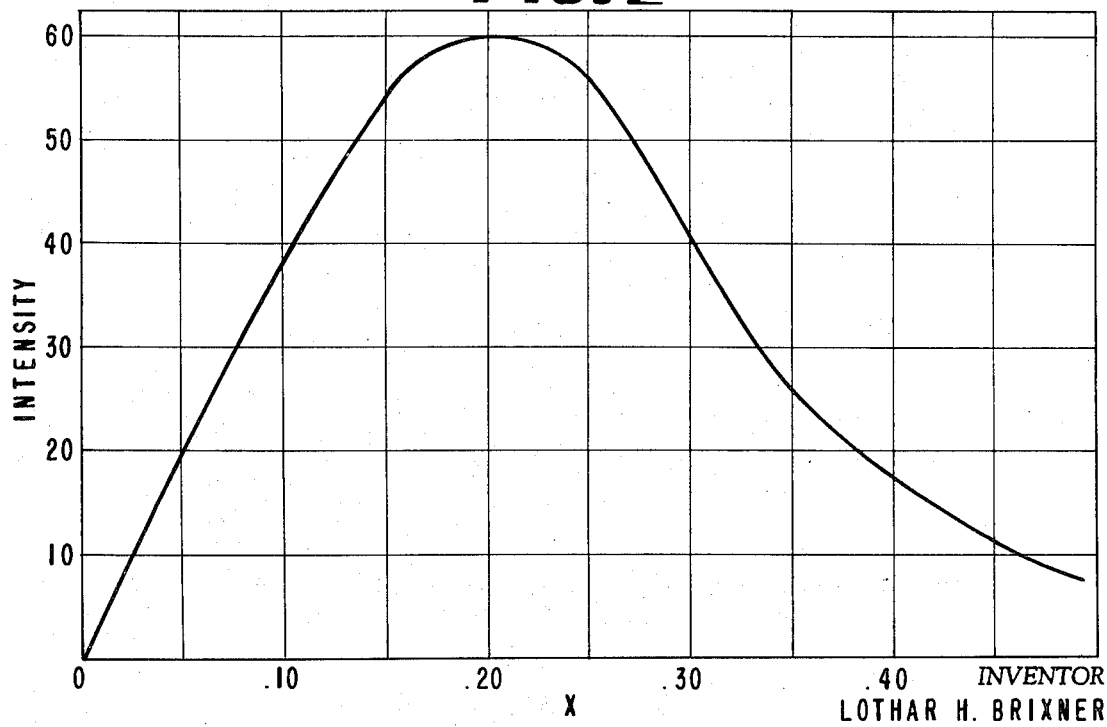

FIG. 1 is a graph of the intensity of fluorescent emission in arbitrary units at the indicated wavelengths, of the composition $Sr_{4.80}Eu_{0.20}(PO_4)_3Cl$, as prepared in Example III hereinafter. On the graph, wavelength of the emission is in nanometers (nm.); and FIG. 2 is a graph of relative intensity of flourescent emission in arbitrary units, under 3600 A. ultraviolet (uv.) excitation, plotted as the function of $x$, the atomic subscript of europium in the composition.

Europium compounds capable of reacting in the process of this invention include $Eu(OH)_3$, $EuCl_3$, $Eu_2(CO_3)_3$, the oxalates or other hydrolysable salts, and the corresponding divalent compounds, when available.

$P_2O_5$ is the preferred source of phosphate although phosphoric acid and ammonium phosphate are effective and other phosphate sources also can be used. It is best to avoid early formation of high melting phosphates such as $Sr_3(PO_4)_2$ in the absence of the europium. Hence, all solid ingredients are preferably throughly mixed prior to heating.

Additional compounds and fluxing agents which would not interfere with the reaction, such as sodium or potassium chloride, can be used in the process to adjust the melting point of the flux or melt or to adjust the reaction conditions. When adopting such practices sufficient strontium still must be present to complete the reaction. Excess strontium-containing compound present in the reaction mix functions as both reactant and flux, hence the term "flux-reaction technique."

Water can be carried into the reaction mixture as a vapor by means of inert gas or air or in the form of steam, superheated if desired, or initially as included with powder reactants. As illustrated in the examples moist air provides oxygen and water vapor for the reaction and serves to agitate the fused reactants or melt when it is bubbled through the melt.

Leaching with water, washing and drying usually suffices to isolate the product crystals. Standard or other known methods may be used to break up the fused matrix, separate and recover the product.

Batch methods of making the new composition are very satisfactory and give good yields (90%) but other methods can be used. Closed vessels permitting operation under superatmospheric pressure can be used when a means for removing the hydrogen chloride (HCl) is provided. Since some of the reactants and products are gas the reaction conditions may be varied by using pressures other than atmospheric which is illustrated.

The reaction can also be conducted in a nearly horizontal rotating tube furnace in which the charge is fed to the upper inlet end and steam or moist air fed at the lower end for counter-current flow. An externally heated tube furnace is satisfactory as is the use of internal combustion of fuel. The fuel will supply at least a portion of the water vapor needed for the reaction. Obviously other useful apparatus can as well be employed.

The product obtained is crystalline, fluorescent europium substituted strontium chloride phosphate of the formula given above. Large needle shaped individual crystals may range up to about 1 cm. long with aspect ratios of the batch varying between 50:1 to 100:1. The bulk of the product crystals range in diameter from 1 to 5 microns. The crystals are in the form of colorless needles characterized by the structural space grouping, $P6_3/m$, of apatite. This is the Herman Maughin space group designation described in Crystallographic Data, Am. Crystallographic Association Monograph #5 by Donnay, Donnay, Cox, Kennard and King. Lattic dimensions are:

$a_h = 9.94 \pm 0.01$ A.

$c_h = 7.20 \pm 0.01$ A.

The invention will be further described in conjunction with the following examples, in which all parts and percentages are by weight unless otherwise indicated or apparent.

EXAMPLE I

Europium strontium phosphate chloride of the formula $Sr_{5-x}Eu_x(PO_4)_3Cl$ wherein $x$ is 0.04, is prepared as follows: Thoroughly mix 5.0 gms. of $P_2O_5$, 0.20 gm. of $Eu_2O_3$ and 200 gms. of $SrCl_2$. The mixture is placed in a recrystallized alumina container and heated to 1000° C. and further heated until the mixture fuses or melts. Air saturated with water vapor at 80° C. is bubbled through the melted mixtured through an alumina tube. After one hour at about 1000° C. the temperature of the melt is increased to 1200° C. for another hour. Hydrogen chloride gas evolves during the reaction; hydrogen chloride production stops and the reaction is essentially complete near the end of the two hour period. The alumina tube is removed and the mixture allowed to cool. Unreacted components are removed by leaching the mixture with water. Product crystals are separated and recovered from the leaching residue by washing on a filter and drying.

The product is 95–99% of theoretical yield based on the $P_2O_5$ used and is in the form of large relatively perfectly shaped crystals. The product emits peak radiation at about 4420 A. under 3600 A. uv. excitation. The composition has the apatite crystal structure and space group, $P6_3/m$, with $a_h = 9.94 \pm 0.01$ A. and $c_h = 7.20 \pm 0.01$ A. The chemical composition and value of $x$ is confirmed by chemical analysis of the product and reaction stoichiometry.

EXAMPLES II to VI

Other europium substituted strontium phosphate chloride compositions wherein $x$ is equal to 0.11, 0.20, 0.29, 0.38 and 0.47 are prepared by the procedure of Example 1 using $Eu_2O_3$ in amounts equal to 0.4, 0.8, 1.2, 1.6 and 2.0 gms. and are designated Examples II through VI respectively. The product of each example is separated, recovered, tested and confirmed in the same manner as in Example I. Data on all of Examples I to VI are tabulated in Table I.

TABLE I.—COMPOSITION OF EXAMPLES

| Example | Formula | $x$ | Components (gms.) | | |
|---|---|---|---|---|---|
| | | | $Eu_2O_3$ | $P_2O_5$ | $SrCl_2$ |
| I | $Sr_{4.96}Eu_{0.04}(PO_4)_3Cl$ | 0.04 | 0.200 | 5.0 | 200 |
| II | $Sr_{4.89}Eu_{0.11}(PO_4)_3Cl$ | 0.11 | 0.400 | 5.0 | 200 |
| III | $Sr_{4.80}Eu_{0.20}(PO_4)_3Cl$ | 0.20 | 0.800 | 5.0 | 200 |
| IV | $Sr_{4.71}Eu_{0.29}(PO_4)_3Cl$ | 0.29 | 1.200 | 5.0 | 200 |
| V | $Sr_{4.62}Eu_{0.38}(PO_4)_3Cl$ | 0.38 | 1.600 | 5.0 | 200 |
| VI | $Sr_{4.53}Eu_{0.47}(PO_4)_3Cl$ | 0.47 | 2.000 | 5.0 | 200 |

A composition with $x$ equal to 0.20, such as is produced in Example III, exhibits the maximum intensity under 3660 A. ultraviolet (uv.) excitation when compared with compositions of the other examples. Figure II shows that the intensity is at a maximum near $x = 0.20$.

Comparison of the composition of the invention in which $x$ is in the preferred range, 0.2 to 0.60, with calcium tungstate shows that the new compositions exhibit an intensity in the visible blue radiation region under X-ray excitation approximately three times greater than that for high grade laboratory calcium tungstate. Even better results should be noted upon comparing the new composition with a commercial calcium tungstate under ultraviolet excitation.

The new compositions are useful as a fluorescent material which exhibits superior fluorescent radiation efficiency and intensity. They are easily produced with good yield and uniformity of product. It is contemplated that the new fluorescent compositions can be used to intensify the image in X-ray screen and film. Other applications will occur to the artisan upon study of the foregoing specification.

What is claimed is:

1. A process for producing europium substituted strontium chloride phosphate compositions in which europium atoms are present in an amount of about 0.8 to 10 percent of the strontium atoms plus europium atoms comprising, preparing a blend in finely divided powder form of an excess of a source of strontium chloride, a source of $P_2O_5$ and a source of europium oxide; heating and melting the blend at a temperature of about 900 to 1000° C.; bubbling moist air saturated with water vapor at 80° C. through the melt and reacting the components in the presence of moist air; increasing the temperature of the melt toward about 1200° C. and further heating the reaction mixture at that temperature until hydrogen chloride evolution ceases; cooling the melt; and separating and recovering europium substituted strontium chloride phosphate composition from other portions of the cooled melt.

References Cited

UNITED STATES PATENTS 3,509,065  4/1970  Palilla _____ 252—301.4 P
3,513,103  5/1970  Shaffer _____ 252—301.4 P ROBERT D. EDMONDS, Primary Examiner